United States Patent [19]
Koivunen

[11] Patent Number: 6,029,785
[45] Date of Patent: Feb. 29, 2000

[54] FORCE BALANCED MULTI-PART BRAKE BAND WITH SELF-SYNCHRONIZING ACTUATING SYSTEM

[76] Inventor: Erkki A. Koivunen, 18260 Blue Heron Pointe Dr., Northville, Mich. 48167

[21] Appl. No.: 08/983,244

[22] PCT Filed: Jul. 12, 1996

[86] PCT No.: PCT/US96/11626

§ 371 Date: Jan. 12, 1998

§ 102(e) Date: Jan. 12, 1998

[87] PCT Pub. No.: WO97/03304

PCT Pub. Date: Jan. 30, 1997

Related U.S. Application Data

[63] Continuation-in-part of application No. 08/443,155, Jul. 12, 1995, and application No. PCT/US96/06415, May 7, 1996
[60] Provisional application No. 60/002,229, Aug. 11, 1995.

[51] Int. Cl.[7] ..................................................... F16D 67/02
[52] U.S. Cl. ........................... 192/17 A; 475/322; 188/75
[58] Field of Search ........................ 192/17 A; 475/311, 475/312, 315, 126, 128; 188/77 R, 76, 75, 336, 337, 330

[56] References Cited

U.S. PATENT DOCUMENTS

| | | |
|---|---|---|
| 2,409,506 | 10/1946 | McFarland . |
| 3,031,039 | 4/1962 | Goodwin . |
| 3,251,246 | 5/1966 | Foerster et al. . |
| 4,217,974 | 8/1980 | Holcomb, Jr. . |
| 4,360,092 | 11/1982 | Muller et al. . |
| 4,604,914 | 8/1986 | Fisher . |
| 4,860,860 | 8/1989 | Furuya et al. . |
| 4,881,453 | 11/1989 | Armstrong . |
| 4,930,373 | 6/1990 | Nakawaki et al. . |
| 5,031,746 | 7/1991 | Koivunen . |
| 5,106,348 | 4/1992 | Koivunen . |
| 5,281,190 | 1/1994 | Koivunen . |
| 5,588,928 | 12/1996 | Koivunen . |

*Primary Examiner*—Charles A Marmor
*Assistant Examiner*—Saúl Rodriguez
*Attorney, Agent, or Firm*—Reising, Ethington, Barnes, Kisselle, Learman & McCulloch, P.C.

[57] ABSTRACT

A force balanced brake system for effecting ratio changes in transmission comprising a band brake unit (10) having separate bands (12 and 13) selectively engageable with a reaction drum (5), each with a piston apply lug (16 and 18) and anchor lug (17 and 19). With equal area apply pistons (21 and 41) charged with common pressure, apply and reaction forces are equal and opposite. Side loads are eliminated so the brake drum (5) is only piloted as a rotating component. The system provides freewheeler type shifts without specific one-way devices. The brake band unit (10) provides engine braking during vehicle coast. For freewheeler type shifts, the system is staged in a one-way mode and the torque capacity of the band is regulated to vary in direct relationship with the torque band (10) also reduces to a near zero value allowing the brake drum (5) to turn freely in the direction opposite to previous reactive torque.

15 Claims, 6 Drawing Sheets

FORCE BALANCED MULTI-PART BRAKE BAND WITH SELF-SYNCHRONIZING ACTUATING SYSTEM

This application is a continuation-in-part of U.S. Provisional application No. 60/002,229 filed Aug. 11, 1995 and copending U.S. application Ser. No. 08/443,155 filed Jul. 12, 1995, and PCT/US96/06415 filed May 7, 1996 which claims the priority of U.S. patent application 08/436,756 filed May 8, 1995.

FIELD OF INVENTION

This invention generally relates to automatic change ratio transmissions, and more particularly, to a new and improved force balanced friction holding device with two friction bands and its actuating systems providing smooth self-synchronized gear ratio changes.

BACKGROUND OF INVENTION

In pursuit of the best possible shift quality, many modern automatic transmissions use one-way sprag or roller clutches, often in series with a multi-plate clutch for establishing intermediate transmission gear ratios. Such constructions inherently provide high quality gear shifts with the least complicated control system. However, transmissions with such one-way clutches usually require yet another friction device for coast braking thereby making the transmission larger, heavier and costlier. For this reason, many modern automatic transmissions employ friction brake bands as grounding devices in place of one-way clutches even when desirable shift quality is sacrificed.

The friction brake band systems of such transmissions however are of compact construction and have less parasitic losses than multiple plate clutches when running in a released state. They also have an important functional advantage over the multi-plate clutches in that the torque capacity of a friction brake band in one direction (i.e. drive) is much higher than in the opposite direction (i.e. coast) making the calibration of power-on shifts off of a band much easier than off of a clutch, which has the same torque capacity in either direction.

In the event, the obtained shift quality from brake bands, is generally not as good nor as consistent as can be obtained with a one-way roller or sprag clutch. Poorly calibrated shifts with brake bands or multi-plate clutches, besides being uncomfortable to the driver and passengers, reduces the life of friction elements and can cause a premature failure of the transmission.

Normally, a friction brake band occupies far less transmission housing or gear box space than any functionally equivalent alternative. Often, some of this advantage is lost when a special radial bearing is required for supporting the brake drum to ground when side loads are applied to the drum by the band. The bearing is resultantly subjected to transversely directed brake actuating forces. The ideal position for this radial bearing for the drum is in the plane of these forces such that no cocking of the drum will take place when side loaded from apply of the band. This, however, precludes its placement over rotating gear units or other gear box components. Such distinct disadvantages severely limit the options available to a transmission designer pursuing the most compact, lightest and the least expensive gear box arrangement. Furthermore, misalignment caused by a side loaded brake drum can lead to gear noise problems and detract from the durability of the transmission.

A solution to such problems is found in the brake band system of this invention, in which all forces acting on the band are balanced and the brake drum is not subjected to any side loading when engaged. In this invention, the brake drum need not be supported directly to ground and only needs piloting like any other rotating transmission component. In one embodiment of this invention the brake band is split into two separate half-bands, each applied with an equal force acting in opposite direction so that an encompassed drum and attached gear element of a planetary gear set are held for reaction to condition the transmission for a predetermined drive ratio. In another preferred embodiment, the brake band comprises two individual full wrap bands: an inner full-wrap single strap band straddled by the side straps of an outer full-wrap band. In this case the apply and reaction lugs of the outer band connect the outer ends of the side straps to one another and form bridging over the single wrap inner band.

Both of these force balanced brake bands can be operated by a self-synchronizing actuating system based on the systems of my co-pending and parent patent applications, (1) PCT/US96/06415 filed May 7, 1996 which claims the priority of U.S. Ser. No. 08/436,756 filed May 8, 1995 for SELF-SYNCHRONIZING BRAKE BAND ACTUATING SYSTEM FOR AUTOMATIC CHANGE SPEED TRANSMISSIONS, and (2) U.S. Ser. No. 08/443,155 filed Jul. 12, 1995 for FORCE BALANCED BRAKE BAND WITH SELF-SYNCHRONIZING ACTUATING SYSTEM. Both of these applications describe a brake band actuating systems allowing freewheeler type power-on upshifts and downshifts for changing gear ratios without supplemental one-way roller or sprag clutches. Application Ser. No. 08/436,756 discloses a band unit, single or double wrap, for example, with one apply piston and one reaction piston and related controls. Application Ser. No. 08/443,155 discloses a band unit with half bands with separate reaction constructions and apply piston and controls.

SUMMARY OF INVENTION

This invention provides new and improved brake units with two bands for each drum and controls providing freewheel type for gear ratio changes in power transmissions that are free of side loading eliminating the need for central bushings or bearings to support brake drums directly to ground.

These brake band constructions may utilize controls similar to those of my co-pending applications Ser. No. 08/443,155 and U.S. Pat. No. 08/436,756, hereby incorporated by reference, to obtain self-synchronized gear ratio changes.

The first and second preferred embodiments of the force balanced brake band consists of two fully separate half-bands, each having its own apply piston and anchoring device. With the apply pistons of both bands charged with a common pressurized fluid, the respective apply and reaction forces always remain equal and opposite and the vector sum of these forces is always zero. In this invention, side loading of the brake drum is importantly eliminated so that the drum need not be supported to the ground, only piloted like any other rotating transmission component. The elimination of support structure usually needed for such support purposes provides important economies and readily covers the cost difference between the band of this invention and a conventional single wrap band.

In the case of the first and second preferred embodiments, having two reaction forces, each substantially lower than the one reaction force in a single wrap band significantly reduces the peak unit load on the lining material at the anchor end of each band. This increases the thermal capacity of the band resulting in a more durable and abuse resisting friction element.

In the first and second embodiments of the band system of this invention possesses yet another notable characteristic: since there is less self-generation the difference in torque capacity between drive direction and coast direction is significantly smaller than in a single wrap brake band system. Having less self-energization can be advantageous during a power downshift where a band with a high degree of self-energization tends to be excessively "grabby". Another advantage of this invention arises when more torque capacity is required in the coast direction than is available with a conventional single wrap band.

In the third and fourth preferred embodiments the friction band consists of a single strap inner band straddled by a two-strap outer band. The straps in the outer band are held together by lugs attached to the to the straps at each end of the band. The actuating system for the second embodiment is essentially the same as the actuating system for the first embodiment of this invention.

There are two ways to enhance this basic system to optimize the production of high quality shifts. The first one of these suited for the first embodiment of this invention is the electronically controlled shift timing with a complexity similar to what is required to control clutch-to-clutch shifting. The other way, which is incorporated in all other presented embodiments of this invention, is generally based on the self-synchronizing principle of my copending patent applications, Ser. No. 08/436,756 and 08/443,155 referenced above, providing smooth and consistent freewheeler power-on shifts hydromechanically and can, if desired, be further fine tuned electronically for the best possible shift feel.

DETAILED DESCRIPTION OF THE INVENTION

Figure 1:
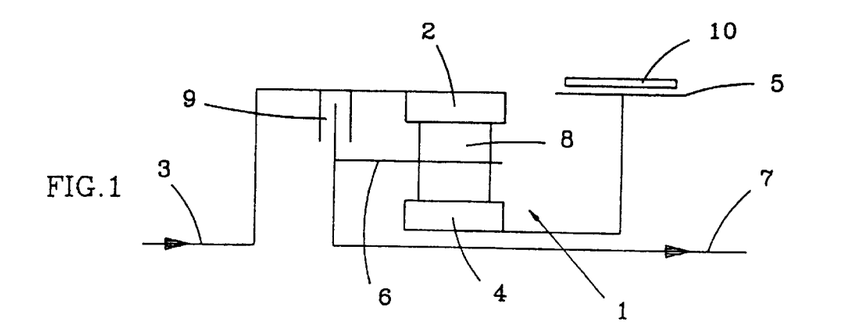
FIG. 1 is a diagrammatic view of a simple two-speed transmission used here to assist in explaining the subject invention.

A simple two-speed transmission shown in FIG. 1 is used to describe the involved gear and friction elements, and their functions during ratio change events. This transmission consists of a simple planetary gear unit 1 having an annulus gear 2 drivingly coupled with input shaft 3, a sun gear 4 connected with brake drum 5, and a planet carrier 6 connected with output shaft 7. Planet gears 8 mesh with annulus gear 2 and sun gear 4. A force balanced friction band 10, which is free of side loads and is the subject of this invention, is engaged to hold the drum 5 and the sun gear 4 attached thereto stationary to set the transmission in low gear. Transmission is upshifted to direct drive by applying clutch 9.

Figure 2:
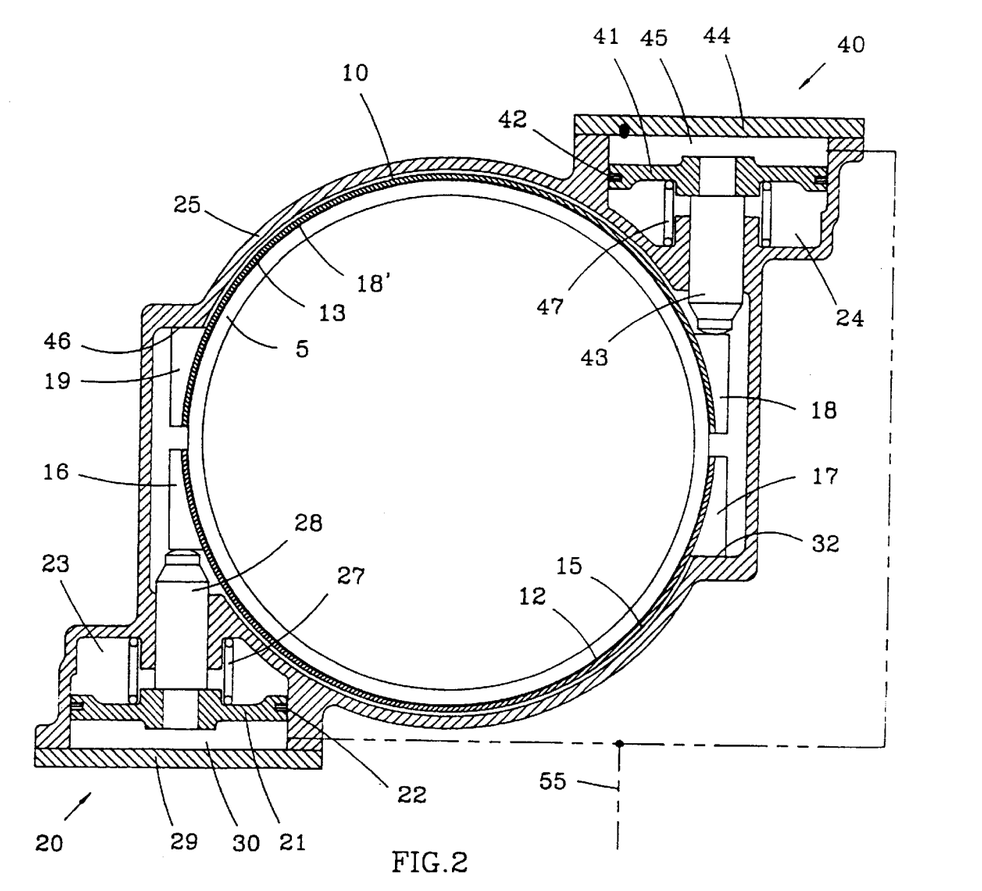
FIG. 2 is a cross-sectional view of a balanced brake band system of one preferred embodiment of this invention.

An actuating system suitable for use with the force balanced brake band of this invention is shown in FIG. 2. The sideload free brake band system of this invention includes a friction band 10 consisting of two half-bands 12 and 13 substantially encircling the brake drum 5. The lower half-band 12 has a friction lining 15 on its inner surface for selected frictional contact with the lower half of the brake drum 5 and lugs 16 and 17 attached to each end of the half band. Its actuating system 20, operatively disposed in a vertical servo cavity 23 in transmission case 25, consists of an apply piston 21 having an annular seal 22 installed on its outer periphery and an upward extending apply pin 28. A helical compression spring 27 acting between piston 21 and the end wall of the servo cavity 23 returns the piston to its retracted position against a cover plate 29 closing the servo cavity 23.

When chamber 30 formed between piston 21 and servo cover plate 29 is pressurized, the piston 21 moves upward transmitting the hydraulic force exerted on the piston to the to the lug 16 attached to the apply end of the half-band 12. The reaction end of the band is held stationary by the lug 17 thrusting against an abutment 32 formed in transmission case 25.

The upper half-band 13 and its actuating system are the same as in the lower half-band system rotated 180 degrees around the center axis of transmission case 25. This band has a friction lining 18' covering the upper half of the brake drum 5, as well as lugs 18 and 19 attached to each end of the band. Its actuating system 40, operatively disposed in a vertical servo cavity 24 in a transmission case 25, consists of an apply piston 41 having an annular seal 42, and an downward extending apply pin 43 attached to piston 41. Spring 47 urges the piston to its retracted position against a cover plate 44. When chamber 45 formed between piston 41 and servo cover 44 is pressurized, the piston 41 moves in a direction opposite to that of piston 21, i.e., downward transmitting the hydraulic force to the lug at the apply end of the half-band 13. The reaction end of the band is held stationary by the lug 19 thrusting against an abutment 46 formed in transmission case 25.

The actuating system for this embodiment is activated by charging chambers 30 and 45 with fluid from a common pressure source 55. The respective forces exerted on the apply and reaction ends of each half-band are directionally opposite and equal in magnitude thereby freeing the brake drum from any side loading and eliminating need for a radial support to the ground.

Figure 3:
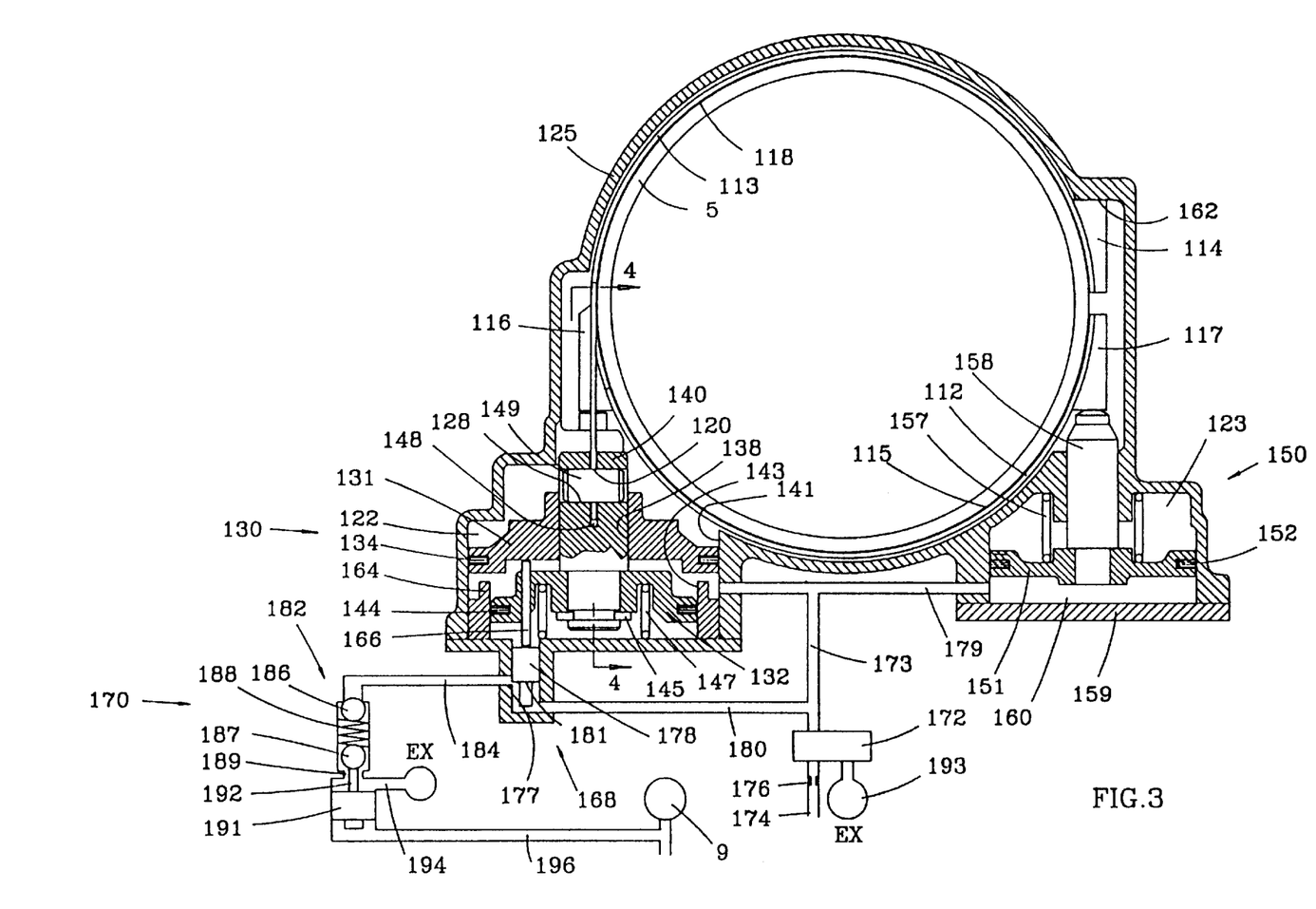
FIG. 3 is a cross-sectional view along a transverse centerline of another preferred embodiment of the force balanced brake band and its self-synchronizing actuating system.
Figure 4:
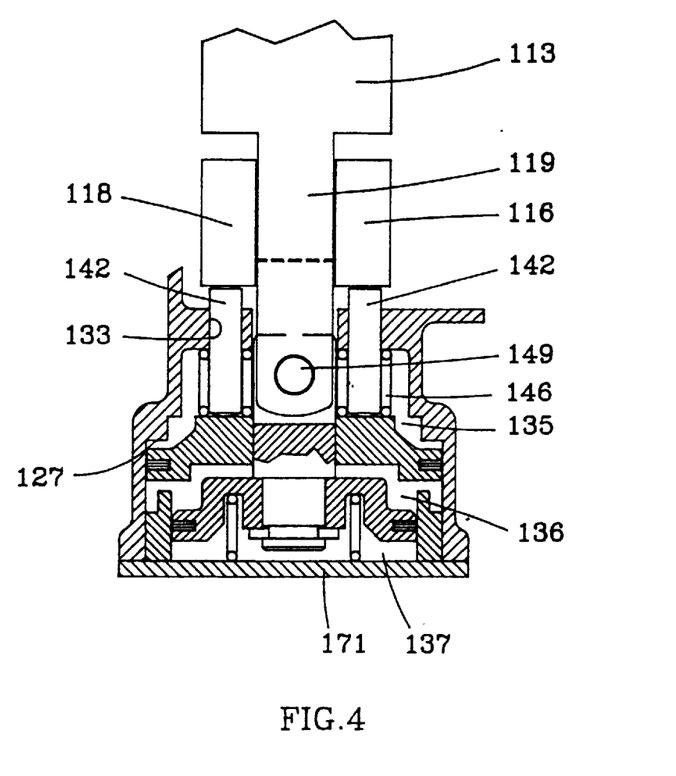
FIG. 4 is a sectional view taken generally along the sight line 4—4 of FIG. 3 through the left side servo.

Another preferred embodiment of the force balanced brake band incorporates a self-synchronizing actuating system for providing freewheeler type power-on shifts without the use of one-way roller or sprag clutches. This is illustrated in FIGS. 3 and 4, which show two half-bands 112 and 113 cooperatively encircling the brake drum 5 and the band actuating system effecting the freeweeler shift feature. The lower half-band 112 has on its inner surface a friction lining 115 covering the lower 180 degrees of the brake drum surface and lugs 116 and 117 attached to each end of this band. The upper half-band 113 has on its inner surface a friction lining 118 covering the upper 180 degrees of the brake drum surface, a lug 114 attached to the reaction end of the band and a narrowed down portion 119 of the band at the apply end thereof, which extends downward beyond the horizontal centerline of the transmission. Hole 120 at the narrowed band end attaches the band to a pull rod and thereby to its actuating piston as will be described later.

The actuating system for the brake band system includes two servos, one on the left side having two pistons operatively disposed in a vertical servo cavity 122 formed in transmission case 125, and the other on the right side having a single piston operatively disposed in a vertical cavity 123. All three pistons are subjected to the a common apply pressure, when the band control system is activated.

The left side servo 130 comprises a first piston 131, which operatively is the reaction piston for the lower half-band 112 and a smaller second piston 132 functioning as a apply piston for the upper half-band 113. The first piston 131, having a central bore 138 therethrough and an annular seal 134 installed on its outer periphery, is disposed slidably in a vertical bore 141 in transmission case 125. The apply force is transferred from the first piston 131 to the lugs 116 in the lower band 112 through a pair of pins 142 extending through guide holes 133 in the bottom wall of the servo cavity 122.

The second piston 132 having a seal 144 on its outer periphery is disposed slidably inside a bore 143 in a sleeve 164 inserted in the servo cavity 135. A pull rod 140, passing through the central bore 138 in first piston 131 and affixed to the second piston 132 with a snap ring 145, is used to transmit the apply force from the second piston 132 to the upper half-band 113. The upper half-band 113 is attached to the pull rod 140 having a longitudinal slot 148 and a cross hole 128 by entering the narrow band end 119 with a cross hole 120 into the slot 148 and locking it by pushing a hardened pin 149 through the aligned cross holes. The reaction end of the band is held stationary by the lug 114 thrusting against an abutment 162 formed in transmission case 125.

A chamber 135 formed by the transmission case cavity 122 above the first piston 131, as well as the chamber 137 formed between the second piston 132 and a cover 171 enclosing the servo cavity, are both vented into the interior of transmission case 125. Both pistons 131 and 132 are actuated by pressurizing chamber 136 formed between the two pistons.

When the band is disengaged, a pair of compression springs 146 co-axial with apply pins 142 return the first piston 131 to its retracted position against the sleeve 164, while the second piston 132 at this time is retracted to its upward position and held against the first piston 131 by a compression spring 147 acting between second piston 132 and servo cover 171.

The construction of the right side servo 150 is basically the same as the servos shown in FIG. 2. Its actuating system consists of an apply piston 151 having an annular seal 152 installed on its outer periphery and an upward extending piston pin 158 attached thereto. A helical compression spring 157 acting between piston 151 and the end wall of the servo cavity 123 returns the piston to its retracted position against a cover plate 159 enclosing said servo cavity. When chamber 160 formed between apply piston 151 and servo cover 159 is pressurized, the piston 151 and the piston pin 158 attached thereto move upward pushing on the end lug 117 of the half-band 112.

The lower band is engaged by the pushing action of its apply piston in the right side servo reacting against the opposing action of the first piston 131 in the left side servo, and the upper half-band by the pulling action of the second piston 132 in the left side servo opposed by the reactive force at the band anchor end.

A schematic control system 170 for the self-synchronized friction band shown in FIG. 3 includes a conventional shift valve 172, an exhaust control valve 168 and a mode valve 182. The exhaust control valve, which regulates the oil pressure in chamber 136, has a single diameter valve spool 178 slidably disposed in a valve bore 177. Valve spool 178 has an edge surface 181, which defines a variable size flow opening to exhaust control port 184. A sensor pin 166 passing slidingly through the second piston 132 transmits the axial movements of the first piston 131 to the valve spool 178.

The mode valve 182 includes two ball valves each performing their own specific control function. The first of these ball valves sets the band actuating system either in normal or lock mode, where the band functions like a conventional transmission friction band, or in an one-way mode, where the band system becomes a one-way holding device transmitting torque in one direction and freewheeling in the opposite direction. The transmission operates in normal driving in the lock mode and is placed in the one-way mode only for shifting. The second function of this valve is to regulate in one-way mode a low (5–10 psi) pressure, a "tickle pressure", required primarily to initiate the band engagement during a downshift event and to assure that a freewheeling band, during a brief period it operates in one-way mode, is able to re-engage when the vehicle switches from coast to drive.

The upper valve is a ball-type pressure regulator having a steel ball 186 biased by a compression spring 188 for regulating the low tickle pressure. The system mode is set by the lower valve having a steel ball 187 also biased by spring 188. This valve is normally seated and blocks the flow downstream from the ball pressure regulator thereby nullifying its regulating action. The band in this lock or normal mode functions like a conventional transmission friction band. A small piston 191 placed below the ball 187 has in its upper end a small extension 192 protruding into the valve seat hole 189. Hydraulic pressure present in passage 196 moves the piston 191 to its up-position unseating the ball 187 and thereby opening a connection from the ball valve 186 to the exhaust port 194. This sets the system in the one-way mode.

The transmission line oil is supplied to the shift valve 172 via passage 174 and through a feed orifice 176. In the on-position the shift valve 172 directs the oil to the passage 173 leading to the feed port 180 of the exhaust control valve 168 and to the passage 179 leading to pressure chambers 136 and 160.

In a released state, with shift valve 172 in off-position and chambers 136, 160 exhausted, the band system is fully disengaged and all pistons are in their retracted positions. The first piston 131, operative in the left side servo as a reaction piston for the lower band 112, is pushed downward against sleeve 164 by springs 146. Likewise, the second piston 132 operative as a apply piston for upper band 113 is pushed upward against an abutment 127 by the action of spring 147.

The right servo chamber 160 is exhausted and the apply piston 151 for the lower band 112 returned against the cover plate 159 by spring 157. It should be noted, that the upper half-band, which is really a conventional friction band surrounding only the top half of the brake drum circumference, functions as a slave of the lower half-band operative for controlling torque capacities of both half-bands.

To establish a second gear range the band system is applied, with the controls in normal lock mode, by moving the shift valve 172 to an on-position. This allows pressurized oil in passage 174 to flow through a fixed orifice 176 into passages 173 and 179, and further into chambers 136 and 160. With chamber 160 in the right side servo pressurized, the apply piston 151 moves upward against the lug 117 to start the engagement of the lower half-band 112. In the left side servo pressure oil in chamber 136 exerts a hydraulic force on the first piston 131 causing it to move upward against the reaction end lug 116 of the lower half-band 112. This force counteracts the force from apply piston 151 and the counter-clockwise reaction force from the torque carrying half-band 112. The piston areas are selected such that the hydraulic force on the first piston 131 normally exceeds the band reaction force thereby causing the first piston to move upward against an abutment 127.

Figure 5:
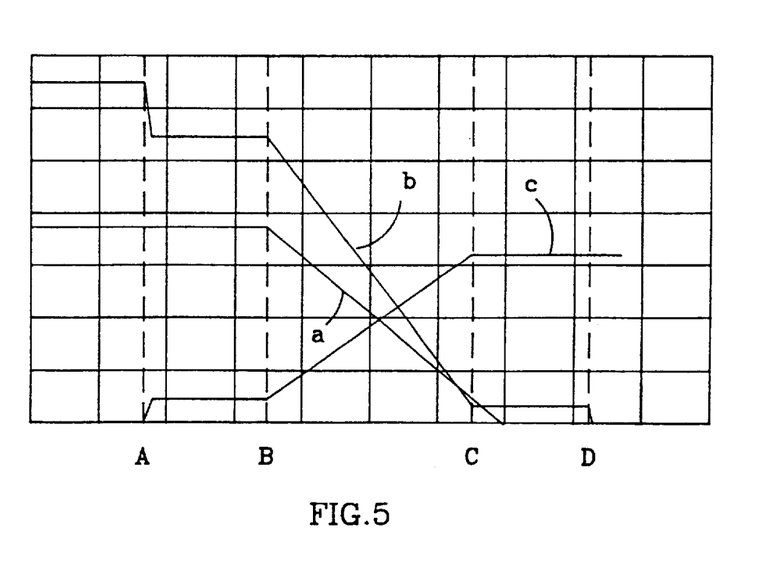
FIG. 5 is a graphical presentation of friction element torques during a power upshift.

The events during a power upshift to the third gear are described by referring to the FIG. 5, which is a graphical presentation of torques during the shift. Prior to the start of the shift the brake band system 10 of the transmission 1 is engaged for holding the sun gear 4 stationary. The torque carried by the band is depicted by line "a". Line "b" shows the torque capacity of the band which is initially determined by the control system line pressure. The on-coming clutch 9 is at this time disengaged and carries no torque as shown by the line "c".

Upon a shift signal at point A, the piston chamber of the clutch 9 is pressurized. Pressure oil charging clutch 9 enters also in passage 196 leading to mode valve 182, where it by pushing the small piston 191 upward unseats the ball 187 and stages the band system 10 in the one-way mode. With the exhaust port 184 now open to the exhaust through the mode valve 182, the oil discharged through this port lowers the pressure acting on all pistons until a force equilibrium is restored, i.e. until the hydraulic piston force equals the band torque related reaction force.

At point B, after the piston in the clutch 9 has advanced forward to thrust against the clutch pack, the torque transmitted by the clutch starts building up. Simultaneously, the torque carried by the off-coming band system 10 decreases inversely to torque carried by the on-coming friction element. During this period the regulated torque capacity of the band system remains linearly related to the torque that the bands are carrying.

At point C, which is the end of the torque phase of the shift, the torque transfer between the friction elements is completed and the torque carried by the band system 10 is zero. Torque capacity of the band has converged simultaneously to a near-zero value, and drum 5 is free to rotate in opposite direction. The line 196 pressurized with clutch 9 apply oil keeps the mode valve 170 in one-way mode, which at this time is insignificant since the band 10 is already disengaged, but desirable because it leaves the system prepared for a subsequent downshift back to the second gear. At an elective point D shift valve 172 moves to the off-position releasing the band and thereby fully removing the drag torque present during the period between points C and D. The resulting quality of the described self-synchronized shift will be consistently smooth and comparable to a shift off a freewheeler.

Power downshifting from a higher gear ratio to a lower ratio requires that the self-synchronizing friction band system is in a one-way mode before the off-coming clutch is signaled to start disengaging. In the case of the example transmission shown in FIG. 1 this means that the band 10 is ready to take over when the direct clutch 9 starts slipping.

Initially, the multi-plate clutch 9 is engaged and the released self-synchronizing band system 10 set in a one-way mode. All pistons are in their retracted positions.

On the shift signal the shift valve 172 directs an orifice restricted oil flow from the supply line 174 to the feed passage 173. The mode valve 170 is in the one-way mode and both piston chambers 136 and 160 are charged with tickle pressure regulated by the ball regulator valve included in mode valve 170. This pressure is just high enough for all piston to overcome their return spring and move forward to push both half-bands into a light engagement with brake drum 5. The resulting drag torque is minimal since the resulting torque acts in the de-energized direction. Due to the presence of tickle pressure in chamber 136, the first piston 131 moves to the upward rest position maintaining a wide open exhaust control port. At the end of the torque transfer phase, when the off-coming clutch 9 clutch starts slipping, the drum 5 slows down and is about to change its direction of rotation. That changes the direction of torque transmitted to both half-bands and causes the first piston 131 and valve spool 178 move downward thereby restricting the outflow from piston chambers 136 and 160 through the exhaust port 184. Consequently, the torque capacity of the band, now working in energized direction, rises rapidly. This self-synchronous action clamps the bands instantaneously, behaving much the same way as a one-way roller or sprag clutch would behave in the same situation. The system is reverted back to the normal any time soon after the shift is completed.

It should be noted that shift timing with this invention is due to the self-synchronizing feature and that complicated hydraulic or electronic controls are not required. The only requirement for all embodiments of this invention is that the system converts into the one-way mode before the beginning of the speed change phase. This applies to both power upshift and downshifts. Upon completion of the downshift the system converts back to the locked mode.

Both power upshifts and downshifts provided by this invention will be consistently smooth and jerk-free. All coast shifts are made with the system set in the lock mode, and they are similar to those with the current automatic transmissions.

Figures 6, 7, 8:
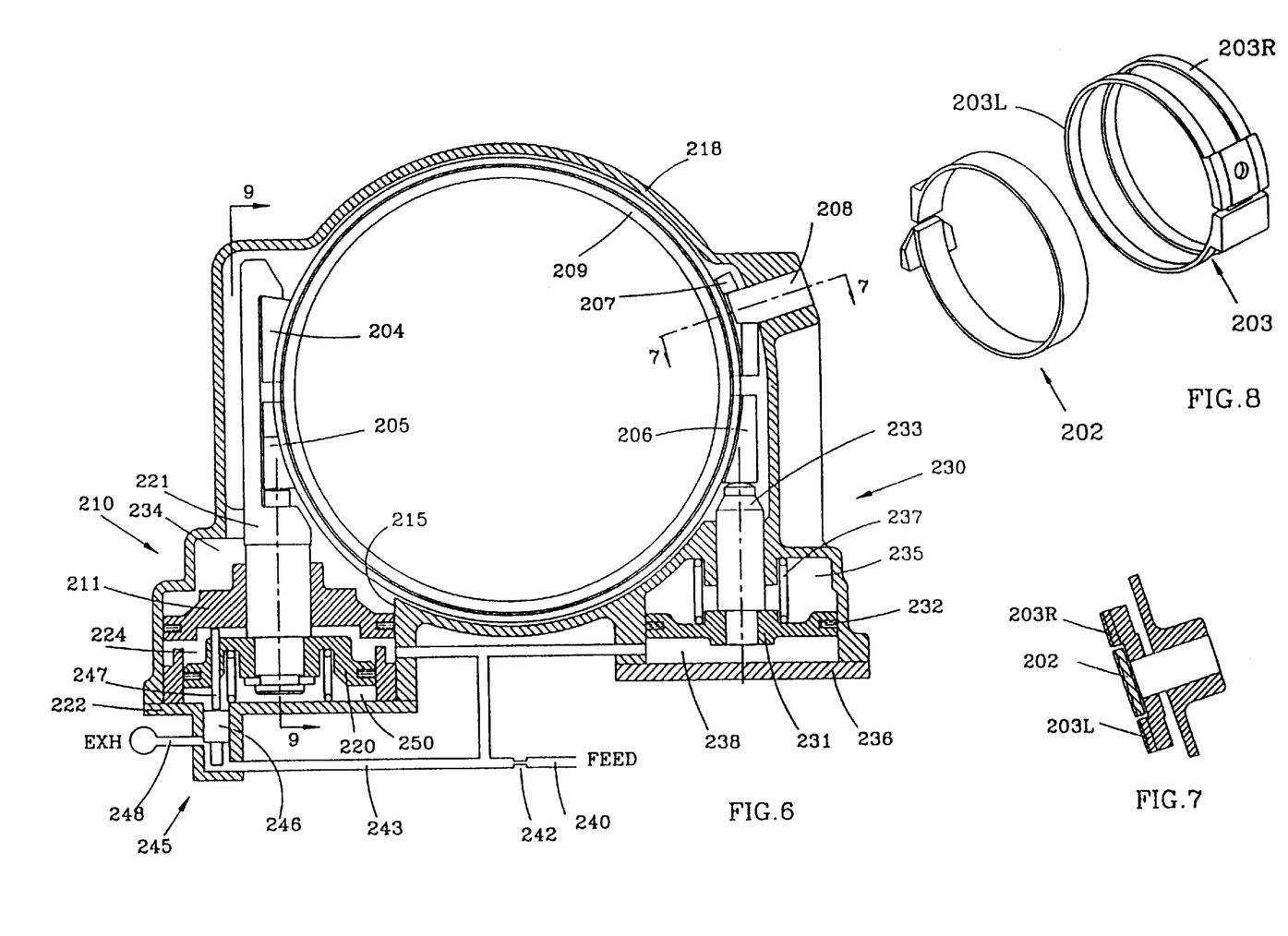
FIG. 6 is a cross-sectional view along the transverse centerline of a band showing a third preferred embodiment of the force balanced brake band and its self-synchronizing actuating system.
FIG. 7 is a sectional view along the sight line 7—7 through the anchor end of the band shown in FIG. 6.
FIG. 8 is a sectional view taken generally along the sight line 8—8 of FIG. 6 through the right side servo.
Figure 9:
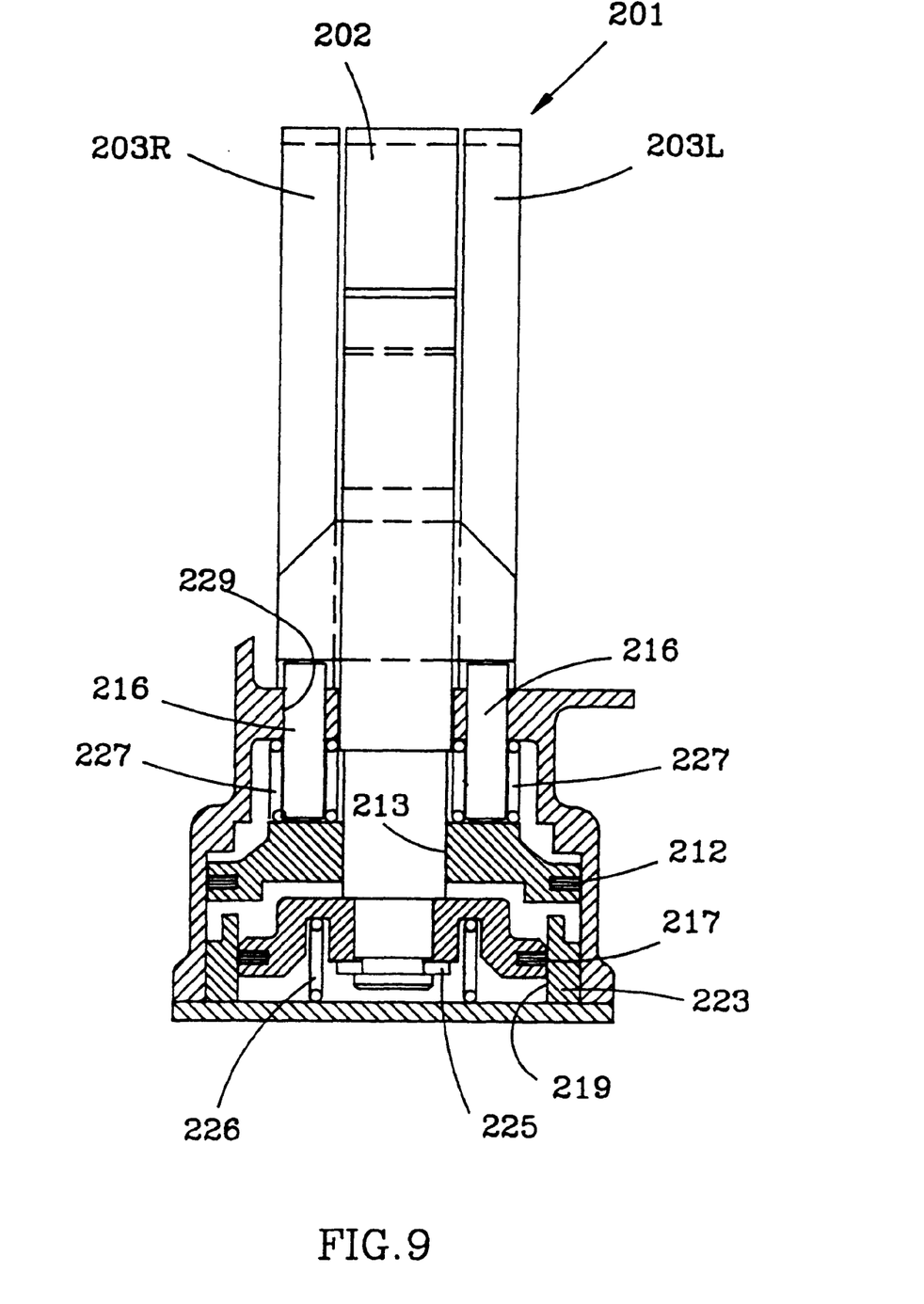
FIG. 9 is an exploded pictorial view of the friction brake bands used in the third embodiment of this invention.

The friction band assembly 201 includes two separate bands, the inner single strap band 202 and an outer double strap band 203, each nearly completely surrounding a brake drum 209. The inner band 202 has a lug 204 attached on its apply end and a lug 205 on its reaction end. The outer band 203 consists of a pair of straps, identified as 203R and 203L, straddling the inner band 202. These straps are joined to each other at each end of the band by lugs 206 and 207—by the lug 206 at the apply end and the lug 207 at the reaction end. A radially oriented hole in lug 207 is provided for a reaction pin 208 for anchoring reaction end of the outer band 203 to the transmission case 218.

The actuating system for the brake band system includes two servos, one identified as 210 on the left side having two pistons operatively disposed in a vertical servo cavity 234, and the other identified as 230 on the right side having a single piston operatively disposed in a vertical cavity 235. All three pistons are subjected to the a common apply pressure, when the band control system is activated.

The left side servo 210, which is associated with the inner band 202, comprises a reaction piston 211 and a apply piston 220. Reaction piston 211, having a central bore 213 therethrough and an annular seal 212 installed on its outer periphery, is disposed slidably in a vertical bore 215 in transmission case 218. The force from the reaction piston 211 is transferred to the lug 205 in the inner band 202 through a pair of pins 216 extending through guide holes 229 in the bottom wall of the servo cavity 234.

The apply piston 220 having a seal 217 on its outer periphery is disposed slidably inside a bore 219 in a sleeve 223 inserted in the transmission case bore 215. A pull rod 221, passing through a central bore 213 in reaction piston 211 and affixed to the apply piston 220 with a snap ring 225, is used to transmit a pulling apply force from piston 220 to the inner band 202.

A chamber formed by the transmission case cavity 234 above the reaction piston 211, as well as the chamber 250 formed between apply piston 220 and a cover 222 enclosing the servo cavity, are both vented in the interior of the transmission case. The inner band is engaged by pressurizing chamber 224 formed between pistons 211 and 220.

When the band is disengaged, a pair of compression springs 227 co-axial with apply pins 216 return the reaction piston 211 to its retracted position against sleeve 223, while the apply piston 220 at this time is held retracted to its upward position, against piston 211, by a spring 226 acting between this piston and cover 222.

The construction of the right side servo 230 associated with the outer band 203 includes an apply piston 231 having an annular seal 232 installed on its outer periphery and an upward extending piston pin 233 attached thereto. A helical compression spring 237 acting between piston 231 and the end wall of the servo cavity 235 returns the piston to its retracted position against a cover plate 236 enclosing said servo cavity. When chamber 238 formed between apply piston 231 and servo cover 236 is pressurized, the piston 231 and the piston pin 233 attached thereto move upward pushing on the end lug 206 thereby effecting the engagement of the outer band 203.

The system is fed from a supply line 240 through an orifice 242 to a passage 243 leading to piston chambers 224 and 238, and also branching out to an exhaust control valve 245 operative for regulating pressure present in these chambers.

The exhaust control valve has a spool 246 which is contact with the reaction piston 211 through a pin 247 extending through the apply piston 220. The spool 246 cooperating with an exhaust port 248 forms a variable orifice, which provides means for varying the hydraulic pressure in accordance to the force acting on the reaction end of the inner band 202. Since the torque capacity of a band is proportional to the hydraulic force and the reaction force proportional to the transmitted torque, the torque capacity of the band stays always linearly related to the transmitted torque. Consequently, when the transmitted torque becomes zero and is about to change direction the capacity of the band also drops to a near-zero value and the band becomes effectively released.

The control system for a self-synchronized band employs means for toggling the transmission between the normal lock mode and the one-way mode as well as providing a "tickling" pressure to initiate the engagement of the friction band. These and other controls are based on those of the previously referenced patent applications, Ser. No. 08/436,756 and 08/443,155.

Figures 10, 11:
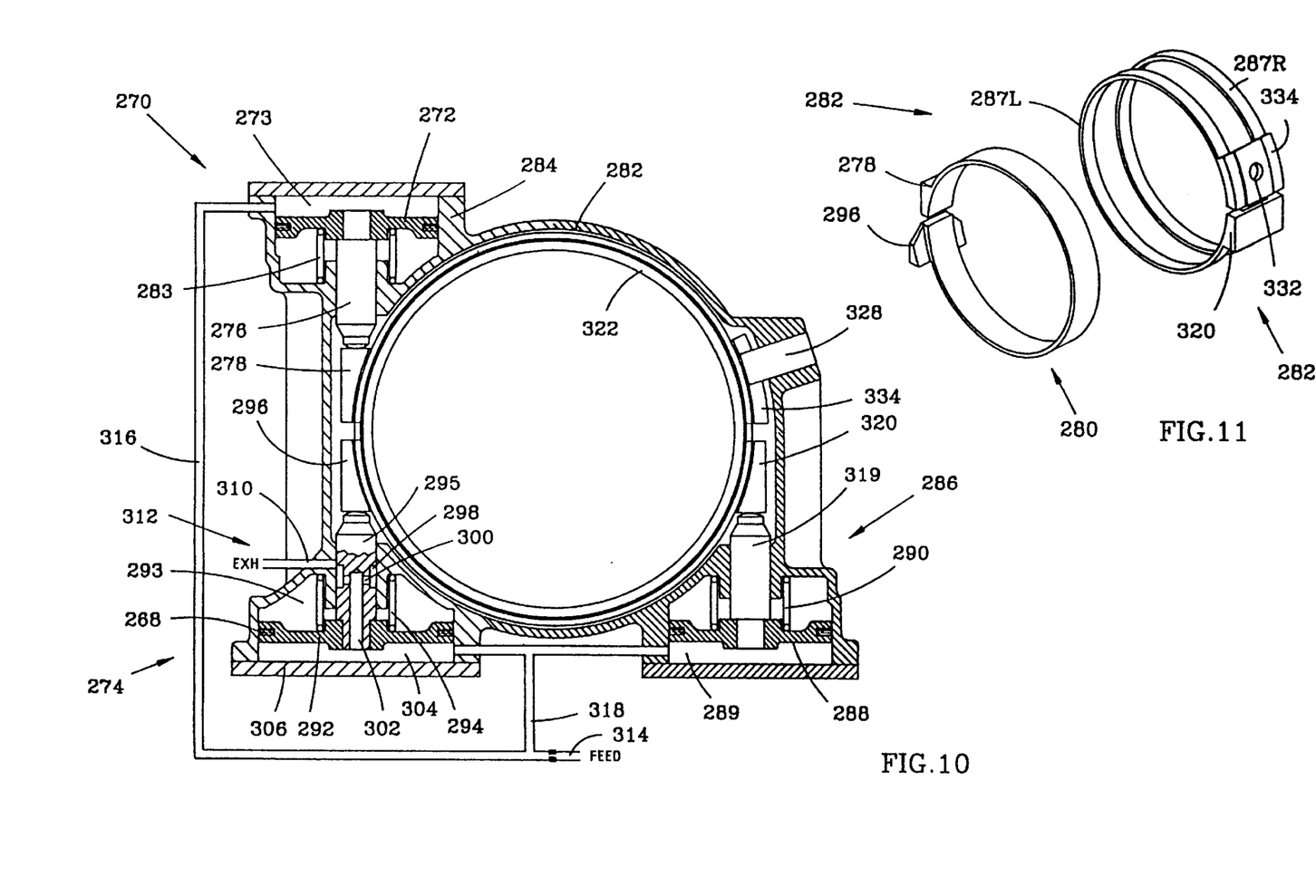
FIG. 10 is a fourth preferred embodiment of the force balanced brake band and its self-synchronizing actuating system of this invention.
FIG. 11 is a pictorial view similar to that of FIG. 9 showing the brake bands for the embodiment of FIG. 10.

In a fourth preferred embodiment of this invention, illustrated in FIGS. 10 and 11, a push type servo system 270 having an apply piston 272 is used instead of the pull type apply system for the brake band of the embodiment of FIG. 6. The servo system 270 is located above the reaction servo 274. The apply piston 272 of servo system 270 is operated by pressure fluid supplied to chamber 273 and has an apply pin 276 which extends downwardly from piston 272 and contacts the apply end lug 278 of the annular inner friction band 280 of the multi-strap brake band assembly 282. In addition to the inner band the assembly 282 comprises a double strap outer band 287. A helical spring 283 mounted around the apply pin 276 is operatively disposed between piston 272 and transmission case structure 284 to urge the piston to a retracted position.

The apply servo system 286 for the double strap outer band 287 includes an apply piston 288 stroked upwardly by pressure oil in chamber 289 against the force of helical return spring 290. The pin of this apply piston extends through a bore in the transmission case to engage the bridge or apply lug 281 connecting the laterally spaced straps of the outer band.

The reaction servo 274 for the inner brake band 280 comprises a reaction piston 292, which is larger in diameter than the two apply pistons 272, 288. The reaction piston 292 is movably mounted in chamber 293 and upwardly against the force of case grounded spring 294 mounted therein. Furthermore, the reaction piston has an upward extending pin 295 secured thereto which engages with the reaction lug 296 affixed to the reaction end of the inner friction band 280 of the brake band assembly.

The reaction piston pin 295 includes an annular recess 298 hydraulically connected via drilled cross and axial passages 300 and 302 with a lower pressure chamber 304, which is formed between reaction piston 292 and a cover plate 306. The annular recess 298 cooperates with an exhaust port 310 to provide an exhaust control valve 312 for regulating the torque capacity of the brake band for self-synchronizing ratio shifts.

A common pressure fluid may be fed from line 314 or other source not shown to all three piston chambers 273, 289 and 304 through passages 316, 318 to establish a drive ratio in the planetary gearing of the transmission of FIG. 1.

Accordingly, for low range drive ratio the force balanced and synchronized brake band arrangement of FIGS. 10 and 11, chambers 273, 289, 304 are charged with apply pressure. Piston 288 for the double strap outer band apply servo 286 exerts apply force through pin 319 and bridge or apply lug 320 connecting the apply end of the double strap outer band 287 to effect the frictional gripping of the drum 322 by the laterally spaced annular friction straps 287L and 287R. The drum 322 corresponds to the drum 5 of the transmission diagrammatically illustrated in FIG. 1.

As shown, the circular double strap outer band 287, with laterally spaced straps 324 and 326 straddling the inner band 280 is anchored by pin 328 which extends from transmission casing 284 into the pin retaining opening 332 formed in the bridge reaction lug 334 at the reaction end of the outer band. The inner band 280 is frictionally applied to the brake drum 322 with apply pressure supplied from line 314 through passage 316 to charge the apply chamber 273 of the push type piston 272. The piston 272 of equal diameter to piston 288 exerts force through pin 276 and apply lug 278 of the circular single strap inner band to effect the full frictional engagement of the drum 322.

As in the previous embodiment, the inner band reaction lug 296 contacts the upper end of the reaction pin 295 urging it downwardly. Counter to this action, the pin 295 is urged upwardly by the force of the pressure oil in chamber 304. The annular groove 298 and the exhaust port 310 cooperate to function as a pressure control valve 312 regulating the pressure acting all three pistons thereby controlling the torque capacity of the friction band system as described previously.

In each of these preferred embodiments of this invention a common pressure is acting on two apply piston having same areas thereby producing two equal and directionally opposite apply forces. Since both bands carry the same torque, the generated reaction forces will also be equal and directionally opposite to each other. Consequently, the resultant of these forces acting on the brake drum becomes zero rendering the friction brake band system free of any side loading. With the drum 322 free of side loads, side loads to elements of attached planetary gearing is eliminated so that the gearing operates in true concentric paths. Further, the requirement for special bearings for the rotatable drum in the plane of the band apply and reaction forces is eliminated.

It should be noted that although these band actuating systems of the various embodiment include a plurality of pistons, their areas are generally smaller than those of equal capacity in conventional brake band systems.

While preferred embodiments of this invention have been shown and described, other embodiments will now become apparent to those skilled in the art. Accordingly, this invention is not limited to that which is shown and described, but by the following claims.

What is claimed is:

1. A force balanced friction brake band system for an automatic transmission having input and output means cooperating with a planetary gear unit with selectively engagable friction members to provide plurality of gear ratios, including a hydraulically operated clutch for establishing one gear ratio and a brake drum connected to said gear unit adapted to be frictionally engaged to condition the transmission for another gear ratio, a transmission case having at least two spaced cavities formed therein, the improvement comprising two half-bands each having an apply end and a reaction end and each disposed to cover up to one half of the circumference of said drum and cooperating to substantially encircle said drum, each of said half-bands having a first abutment member at the apply end thereof and a second abutment member at the reaction end thereof, a fluid pressure source, piston means operative in each of said cavities for effecting engagement of said half-bands of said band system with said drum in response to fluid pressurizing and stroking of said piston means in said cavities, and spring means in said cavities operative for returning said piston means to a retracted position when fluid pressure is removed and said band system is disengaged, an elongated force transmitting member between each piston and said first abutment member associated therewith, abutment means formed in said transmission case for receiving torque related forces from said second abutment member at the reaction end of each half-band, said first abutment member at the apply end of each of said half-bands being subjected to a hydraulic force from said piston means, said second abutment member at the reaction end of each of said half-bands being subjected to a reactive force, said half-bands being in substantially equally spaced positions such that hydraulic forces from fluid pressure being equal in magnitude and opposite in their direction cancel each other and render said brake drum substantially free of any significant side loading to thereby eliminate need for side load bearings for supporting said drum.

2. A force balanced brake band system and controls for an automatic transmission to provide a plurality of gear ratios, said automatic transmission having input and output means and a cooperating planetary gear unit including a hydraulically operated clutch for establishing one gear ratio and a friction drum connected to said gear unit adapted to be frictionally engaged to condition the transmission for another gear ratio comprising, a transmission case having first and second cavities formed therein, said force balanced brake band system including a first half-band and a second half-band each having an apply end and a reaction end and each disposed to cover up to one half of the circumference of said drum, said first half-band having a first abutment member at the apply end thereof and a second abutment member at the reaction end thereof, said second half-band having an extension and an attachment means therefor at the apply end thereof and an abutment member at the reaction end thereof, a first piston having an apply pressure area and operative in said first cavity for effecting engagement of said first half-band in response to stroking of said first piston against said first abutment member of said first half-band, an elongated force transmitting member operative between said first piston and said first abutment member, a second piston operatively disposed in said second cavity, a plurality of pin means disposed between said second piston and said second abutment member in said first half-band and operative therebetween as a force transmitting member, a third piston, having a pressure area substantially equal to said pressure area of first piston, operatively disposed in said second cavity for effecting engagement of said second half-band in response to stroking of said third piston against said first abutment member of said first half-band, an elongated force transmitting member operative between said third piston and said extension in said second half-band, a source of pressure fluid, fluid chambers for said first, second and third pistons chargeable with said pressure fluid, a mode valve means having an inlet port, an exhaust port and a movable valve element for establishing an operational mode for said brake band system, an exhaust control valve means for providing pressure control means having an inlet port for feeding pressure fluid to said chambers, an exhaust port for discharging said fluid from said chambers and a valve element movable by said second piston for effecting a varying the degree of exhaust opening between said piston chambers and said exhaust passage operative for regulating the pressure of said fluid in said fluid chambers according to the position of said second piston such that when a reaction force transmitted to said second piston from said second abutment member of said first half-band increases with increasing band torque and exceeds said opposing hydraulic force, said piston begins to move to progressively close said exhaust opening thereby effecting an increase in pressure in said fluid chambers until a balance of said opposing forces is reached, and conversely, when said reaction force decreases with decreasing band torque and said transmitted reaction force becomes less than said opposing hydraulic force, said piston begins to move to progressively open said exhaust opening thereby effecting a decrease in pressure in said fluid chambers until a balanced condition is again reached between said opposing forces.

3. A force balanced brake band system and a band control unit of claim 2 wherein said mode valve means includes said valve element for establishing an operational mode for said brake band system such that when said valve element is in a normal first position blocking said pressure fluid from flowing from said inlet port to said exhaust port, said brake band system being thereby set in a lock mode and capable of transmitting torque in both directions, and when said valve is moved from said first to a second position thereby allowing free through-flow from said inlet port to said exhaust port and thereby sitting said brake band system in a one-way mode wherein said brake band system is capable of transmitting torque in one direction and freewheeling in opposite direction thereby functioning in a manner of a roller or sprag type one-way clutching device, a feed passage between said pressure fluid source and said inlet port of said exhaust control valve means, a fixed flow restricting means therein, an exhaust passage between said exhaust port of said exhaust control valve means and said inlet port of said mode valve means.

4. The band control unit of claim 3, wherein said regulated fluid pressure charging said fluid chamber for said first piston for exerting an apply force on said abutment member of said first half-band for effecting engagement of said first half-band also charges said fluid chamber for said third piston for exerting an apply force on said abutment member of said second half-band for effecting engagement of said second half-band, said first and third pistons having equal pressurized areas resulting in apply forces which are equal in magnitude and opposite in their direction, said apply forces further generating reaction forces which for both of said half-bands also are equal in magnitude and opposite in their direction such that all apply and reaction forces cancel each other rendering said brake drum free of any side loading when engaged with said half-bands thereby eliminating the need for a stationary structure for supporting said brake drum directly to the transmission case.

5. A force balanced brake band for an automatic transmission of claim 4 having a fluid pressure control system for controlling pressure acting on said first, second and third pistons, said band control system having a valve member operatively connected to said second piston such that when on power upshifts said torque transmitted by said brake band system starts decreasing said valve member is moved by said second piston to progressively open said exhaust port to regulate the fluid pressure in said chambers according to the torque carried by said brake band to obtain a smooth transfer of torque from said brake band to said on-coming friction unit, and on power downshifts said valve member moves to block the flow through said exhaust port to build up pressure in said chambers for rapid engagement of said band at the moment said off-coming friction device being released starts slipping.

6. The force balanced brake band system of claim 4, wherein said exhaust control system is operable to control the torque capacity of said band in proportion to the torque that said brake band is carrying such that when during an upshift to a higher gear ratio said on-coming hydraulically operated clutch has gained sufficient capacity to carry the input torque and the torque transmitted by said self-synchronizing brake band reduces to a zero and is about to reverse, said brake band resultantly becomes disengaged from said brake drum allowing it to freewheel and thereby acting in a manner of a one-way roller or sprag-type coupling device by holding torque in one direction and freewheeling in the opposite direction.

7. The force balanced brake band with self-synchronizing actuating system of claim 4 further providing a pressure control valve in communication with said second port of said exhaust control valve means for regulating a low tickling pressure to act on said first and second piston means thereby producing a low drag torque between said bands and brake drum for initiating a power-on downshift from the higher ratio to a lower ratio and for re-engaging said bands when said transmission, after changing from a driving mode to a coasting mode, again returns back to the driving mode.

8. The force balanced brake band system of claim 4 including said mode valve means having a valve element operative for either blocking flow from the second port of said exhaust control valve and thereby setting the control system in a locked mode, wherein said friction brake band is capable of providing engine braking by holding torque in both rotational directions, or for permitting a free through-flow and thereby setting the control system in a one-way mode where said brake band device is capable of holding torque in one direction and freewheeling in opposite direction.

9. The force balanced brake band of claim 4, normally operating in said lock mode and when a downshift is signaled, is automatically set by said mode valve in said one-way mode, where said low drag torque is established between said brake drum and said brake band, such that when said brake drum at the end of torque phase of a shift starts turning in opposite direction, said brake band will be dragged along causing said second piston move axially far enough to block fluid from flowing through said exhaust control valve thereby causing a rapid rise of pressure acting on said first and second piston means and a resulting instantaneous engagement of said brake band.

10. A force balanced brake drum and friction band system for establishing an input/output speed ratio of a planetary gear unit, said brake drum being operatively connected to said gear unit and being operative to be held from rotation by said friction band system to condition said gear unit for at least one speed ratio and releasable therefrom so that said drum can turn freely for a subsequent speed ratio, the improvement to the said friction band system comprising first and second band members each substantially encompassing the entire circumference of said drum and engagable therewith to frictionally hold said drum from rotation, each said band member having an apply end and a reaction end, a separate hydraulically actuated piston acting on the apply end of both said band members, and separate means for grounding the reaction end of each of said band members, said first and second band members being disposed relative to one another to a position where mutually equal forces acting on the apply end and reaction end of each band member are opposed and in balance thereby rendering said friction band system and said brake drum substantially free of any sideloading from the engagement of said drum by said band members.

11. The forced balanced brake drum and friction band system of claim 10, wherein said band members comprises first and second separate bands for selective operative engagement with said drum, said second band having a pair of friction straps laterally spaced from one another for selective engagement with portions of said drum, said friction straps disposed along side and straddling said first band member and a hydraulic reaction piston operative to provide self-synchronized shifting and operatively connected to said reaction end of said first band member providing the means for grounding said first band member.

12. The forced balanced brake drum and band unit of claim 10, wherein said band unit comprises first and second band members for selective operative engagement with said drum, said first band having a single strap and said second band having a pair of friction straps laterally spaced from one another for selective engagement with cylindrical portions of said drum and straddling of said first band member and located in such angular position that the forces acting on said friction band become balanced.

13. A friction band system for a drum associated with change ratio power transmission gearing having a cylindrical friction surface with a predetermined width comprising, a. a first friction band curved for selective operative engagement with at least a centralized portion of said circular friction surface of said drum, b. a second friction band having a pair of friction straps straddling the first friction band, c. each of said straps having a friction surface for engaging a portion of said circular friction surface of said drum on either side of said first friction band, d. said first and second friction bands having separate apply and reaction ends so that said bands can frictionally engage with the friction surface of said drum by application of an apply force to each of said apply ends of said first and second bands.

14. The friction band system of claim 13, wherein the second band has at least one bridge connecting said straps extending above and across the first friction band.

15. The friction band system of claim 14, wherein said second band has a bridge connecting said straps at the apply and a bridge connecting said straps reaction ends thereof, and wherein said bridges laterally extend over said first band providing means for applying and grounding said second band.

* * * * *